(12) United States Patent
Shimamura

(10) Patent No.: US 7,224,394 B2
(45) Date of Patent: May 29, 2007

(54) PORTABLE ELECTRONIC EQUIPMENT HAVING A PHOTOGRAPHIC FUNCTION AND A CONCEALABLE LENS

(75) Inventor: Masaki Shimamura, Tokyo (JP)

(73) Assignee: NEC Corporation, Tokyo (JP)

( * ) Notice: Subject to any disclaimer, the term of this patent is extended or adjusted under 35 U.S.C. 154(b) by 728 days.

(21) Appl. No.: 10/319,540

(22) Filed: Dec. 16, 2002

(65) Prior Publication Data
US 2003/0125008 A1 Jul. 3, 2003

(30) Foreign Application Priority Data
Dec. 28, 2001 (JP) ............................. 2001-402055

(51) Int. Cl.
G02B 13/16 (2006.01)
H04N 5/225 (2006.01)

(52) U.S. Cl. ................................. 348/335; 348/333.08

(58) Field of Classification Search ................ 348/335, 348/363, 376, 333.08, 14.02
See application file for complete search history.

(56) References Cited

U.S. PATENT DOCUMENTS

| | | | | |
|---|---|---|---|---|
| 5,619,266 | A * | 4/1997 | Tomita et al. | 348/363 |
| 5,953,052 | A * | 9/1999 | McNelley et al. | 348/14.16 |
| 6,067,116 | A * | 5/2000 | Yamano et al. | 348/372 |
| 6,633,337 | B1 * | 10/2003 | Togino | 348/333.08 |
| 6,803,963 | B2 * | 10/2004 | Yamazaki et al. | 348/375 |
| 6,807,276 | B2 * | 10/2004 | Hirayama et al. | 379/433.07 |
| 6,911,972 | B2 * | 6/2005 | Brinjes | 345/175 |
| 6,965,413 | B2 * | 11/2005 | Wada | 348/376 |
| 2001/0004298 | A1* | 6/2001 | Kobayashi | 359/462 |
| 2004/0082367 | A1* | 4/2004 | Nakanishi et al. | 455/566 |
| 2004/0100598 | A1* | 5/2004 | Adachi et al. | 349/113 |

FOREIGN PATENT DOCUMENTS

| | | |
|---|---|---|
| GB | 2 327 551 A | 1/1999 |
| JP | 1-144018 A | 6/1989 |
| JP | 4-328520 A | 11/1992 |
| JP | 8-65647 A | 3/1996 |
| JP | 10-336498 A | 12/1998 |
| JP | 11-327013 A | 11/1999 |
| JP | 2001-245267 A | 9/2001 |
| JP | 2001-309003 A | 11/2001 |
| JP | 2002-271664 A | 9/2002 |
| JP | 2002-271665 A | 9/2002 |
| JP | 2003-46610 A | 2/2003 |
| JP | 2003-143273 A | 5/2003 |

\* cited by examiner

*Primary Examiner*—Tuan Ho
*Assistant Examiner*—Gevell Selby
(74) *Attorney, Agent, or Firm*—Sughrue Mion, PLLC

(57) ABSTRACT

When no photographing is carried out, a control unit applies no voltage to a dimming film of a lens concealing plate, sets a light blocking state to scatter incident light, and prevents a camera lens from becoming visible. When an operator depresses a photographing mode selection key, the control unit applies a predetermined voltage to the dimming film to set a transparent state, thereby enabling photographing to be carried out. In this state, when photographing a landscape, the operator directs the camera lens to an object, sets a cellular phone ready, decides a composition by watching an image of the object displayed on a main display unit, and correcting a position of the cellular phone, and depresses the photographing mode key again.

8 Claims, 15 Drawing Sheets

PORTABLE ELECTRONIC EQUIPMENT HAVING A PHOTOGRAPHIC FUNCTION AND A CONCEALABLE LENS

BACKGROUND OF THE INVENTION

1. Field of the Invention

The present invention relates to a portable electronic equipment having a photographing function, and more particularly, it relates to a portable electronic equipment such as a cellular phone comprising an electronic camera that is used for photographing landscapes or people.

2. Description of the Related Art

In recent years, a portable electronic equipment such as a cellular phone has been provided with not only calling functions but also a data communication functions. Browsers and mailer programs have been loaded to enable access to be made to home pages through Internet, and electronic mail to be transferred. Thus, Internet connection services and electronic mail services can be easily enjoyed irrespective of time and place.

Recently, for example as disclosed in Japanese Patent Application Laid-Open No. 2001-245267, a portable electronic equipment loaded with an electronic camera has been popularized. In transfer of electronic mail, an operator attaches a surrounding landscape or his own face as image data, and sends the data to a receiver. The receiver can check a condition or the like of the opposite party on a display.

As shown in FIG. 1, a folded cellular phone 101 having such a photographing function is provided with a photograph window 103 of an electronic camera on a backside (side which becomes an outer surface side when the phone is folded) of a casing 102. A camera lens 104 is arranged in the vicinity of the photograph window 103.

A display unit and an operation unit are provided on a front side (side which becomes an inner surface side when the phone is folded) of the casing 102, and an image before the camera lens 104 is displayed on the display unit. An operator (i.e., a photographer) checks a range of an object or decides a composition while watching the image on the display unit.

Just beside the photograph window 103, a small mirror surface unit 105 is provided for deciding a composition, which is used when the operator (photographer) himself or an object after the operator (photographer) is photographed. When photographing himself, the operator (photographer) set the cellular phone 101 ready so as to display his own image on the mirror surface unit 105, and checks non-deviation from a photographing range by watching the image on the mirror surface unit 105.

However, visibility of the camera lens 104 causes a problem that when the operator performs an operation in a place of many people (in a train, a store or the like), the people around him may feel uneasy or uncomfortable because of possible impingement on rights of portrait by being photographed without notice or awareness. In addition, the camera lens 104 and the mirror surface unit 105 have an uncomfortable design feeling, and easily stand out. For reasons of design, the mirror surface unit 104 is provided only in a small region so as not to stand out, making it difficult to accurately check the photographing range. Consequently, impossibility of assuring photographing of a desired image has been a problem.

SUMMARY OF THE INVENTION

The present invention has been accomplished to solve the above-described problems experienced by the related art. Thus, an aspect of the present invention is to provide a portable electronic equipment which enables a photographer to surely know a photographing range and a position of an object during photographing, smoothly decide a composition, and prevent photographing failures without giving impinging upon the publicity rights of the people around the photographer.

To solve the above mentioned problem, a portable electronic equipment of the present invention comprises a forming means for forming an image of an object, and a concealing means for concealing the forming means. The portable electronic equipment further comprises a judging means for judging whether a predetermined condition is satisfied or not and controlling means for controlling the concealing means based on a result of the judging means. The judging means judges whether or not switching is done based on electrical control. The controlling means controls the concealing means to a light transmitting state or a light blocking state by switching based on electrical control. The concealing means comprises a dimming layer that is brought to a light transmitting state for transmitting an incoming light, or a light blocking state for blocking the incoming light by absorbing or scattering it. The concealing means comprises a dimming layer having a light transmittance controlled in accordance with an applied voltage. The dimming layer comprises dispersed microcapsules containing liquid crystals in a base material. The controlling means controls to bring the dimming layer to a light transmitting state by applying a predetermined voltage to the same, and to a light blocking state by stopping the application of the voltage to the same. The portable electronic equipment is preferably a cellular phone. The portable electronic equipment further comprises decision means for deciding a composition of the object. The decision means is arranged in the vicinity of the concealing means and held in a mirror surface state or a non-mirror surface state by switching based on electrical control. The concealing means comprises a first dimming layer having a light transmittance controlled in accordance with an applied voltage. The decision means comprises a mirror surface reflection portion for reflecting an incoming light on a mirror surface, and a second dimming layer arranged on a front surface side of the mirror surface reflection portion and having a light transmittance controlled in accordance with an applied voltage. The portable electronic equipment further comprises a displaying means comprising a liquid crystal panel capable of displaying characters or images. The second dimming layer is arranged on a rear surface side of the liquid crystal panel and the mirror surface reflection portion arranged on a rear surface side of the second dimming layer. The decision means is adapted to the displaying means. The portable electronic equipment further comprises second controlling means for controlling the concealing means and the displaying means to bring the first and second dimming layers to light transmitting states during photographing, and to light blocking states in a period other than the photographing. The portable electronic equipment is preferably cellular phone. The portable electronic equipment may be a foldable cellular phone composed of upper and lower casings connected to each other at a hinge unit. The forming means and the concealing means are arranged on a side that becomes an outer surface side of the cellular phone in a folded state of the cellular phone. The concealing means comprises a dimming layer having a light transmittance controlled in accordance with an applied voltage. The portable electronic equipment further comprises detecting means for detecting an opened/closed state of the cellular phone. The controlling means brings the dimming layer to the light transmitting state or the light blocking state based on a result of the detecting means.

And then, the portable electronic equipment comprises a camera lens that forms an image of an object and a lens concealing plate that conceals the camera lens. The portable electronic equipment further comprises a judging circuit that judges whether a predetermined condition is satisfied or not and a controller that controls the lens concealing plate based on a result of the judging circuit. The judging circuit judges whether or not switching is done based on electrical control. The controller controls the lens concealing plate to a light transmitting state or a light blocking state by switching based on electrical control. The lens concealing plate comprises a dimming layer that is brought to a light transmitting state for transmitting an incoming light, or a light blocking state for blocking the incoming light by absorbing or scattering it. The lens concealing plate comprises a dimming layer having a light transmittance controlled in accordance with an applied voltage. The dimming layer comprises dispersed microcapsules containing liquid crystals in a base material. The controller controls to bring the dimming layer to a light transmitting state by applying a predetermined voltage to the same, and to a light blocking state by stopping the application of the voltage to the same. The portable electronic equipment is preferably a cellular phone. The portable electronic equipment further comprises decision circuit that decides a composition of the object. The decision circuit is arranged in the vicinity of the lens concealing plate and held in a mirror surface state or a non-mirror surface state by switching based on electrical control. The lens concealing plate comprises a first dimming layer having a light transmittance controlled in accordance with an applied voltage. The decision circuit comprises a mirror surface reflection portion for reflecting an incoming light on a mirror surface, and a second dimming layer arranged on a front surface side of the mirror surface reflection portion and having a light transmittance controlled in accordance with an applied voltage. The portable electronic equipment further comprises a display comprising a liquid crystal panel capable of displaying characters or images. The second dimming layer is arranged on a rear surface side of the liquid crystal panel and the mirror surface reflection portion arranged on a rear surface side of the second dimming layer. The decision circuit is adapted to the display. The portable electronic equipment further comprises a second controller that controls the lens concealing plate and the display to bring the first and second dimming layers to light transmitting states during photographing, and to light blocking states in a period other than the photographing. The portable electronic equipment is preferably a cellular phone. The portable electronic equipment is a foldable cellular phone composed of upper and lower casings connected to each other at a hinge unit. The camera lens and the lens concealing plate are arranged on a side that becomes an outer surface side of the cellular phone in a folded state of the cellular phone. The lens concealing plate comprises a dimming layer having a light transmittance controlled in accordance with an applied voltage. The portable electronic equipment further comprises detector that detects an opened/closed state of the cellular phone. The controller brings the dimming layer to the light transmitting state or the light blocking state based on a result of the detector.

Further, a method for controlling a camera lens provided in a portable electronic equipment comprises applying power and setting the camera lens to a light blocking state. The method further comprises judging whether or not a predetermined condition is satisfied and changing the light blocking state to a light transmitting state when the predetermined condition is satisfied. The predetermined condition is that a switch is pushed. The method for controlling the camera lens further comprises judging whether or not the portable electronic equipment is opened. The predetermined condition is that the portable electronic equipment is opened.

According to the present invention, the lens concealing plate is arranged on the object side of the camera lens. By the operation of the operator, the lens concealing plate is brought to the light blocking state mainly in a period other than photographing, thereby preventing the camera lens from becoming visible, and in the light transmitting state mainly during photographing, thereby enabling photographing to be carried out. Thus, even when electronic mail is transferred in a place of many people around the operator in a period other than photographing, it is possible to prevent careless direction of the camera lens from giving any uneasy or uncomfortable feelings to the other people.

It is also possible to improve the design of the portable electronic equipment even with the presence of the camera lens. Since the lens concealing plate is fixed, it is possible to prevent dust or the like from being stuck to the camera lens. Compared with the case of providing a lens cover to be mechanically opened/closed, no time and labor are necessary for manual opening/closing, and a state of enabling photographing is automatically set. Thus, it is possible to carry out quick and sure photographing.

The composition deciding mirror is set to be a mirror surface, and used for deciding a composition. Thus, mainly in a period other than photographing, the mirror surface portion is inconspicuous. The operator can prevent photographing failures by checking the photographing range and the position of the object, and smoothly deciding a composition based on the image of the object displayed on the composition deciding mirror set to be the mirror surface during photographing.

In a period other than photographing, the composition deciding mirror can be used as a normal display for displaying the present time or other information. Also, the composition deciding mirror can be used not only for checking the photographing range but also for adjusting a personal appearance.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EMBODIMENT

Hereinafter, each embodiment of the present invention will be described in detail with reference to the drawings.

Figure 1:
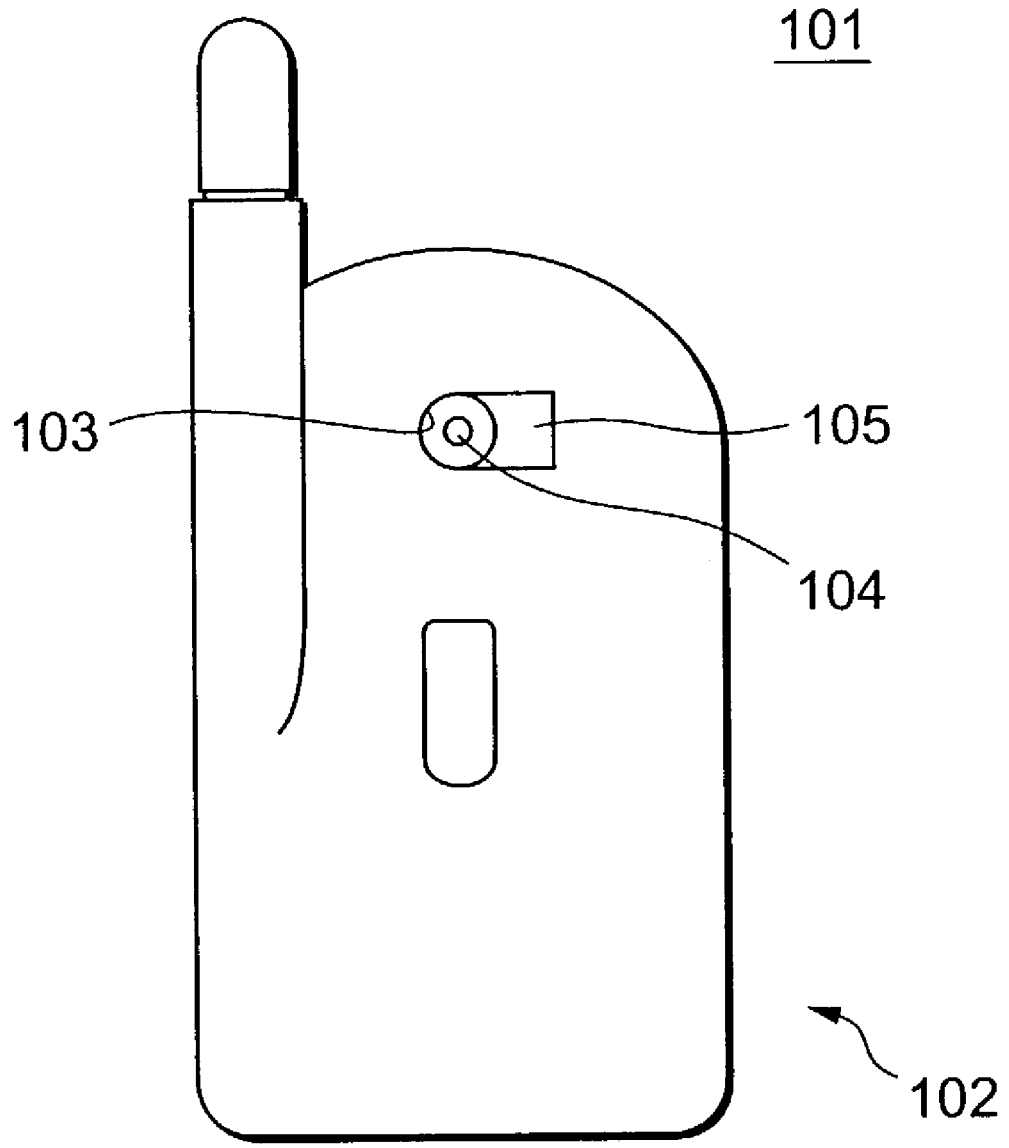
FIG. 1 is an explanatory view explaining a related art.
Figure 2:
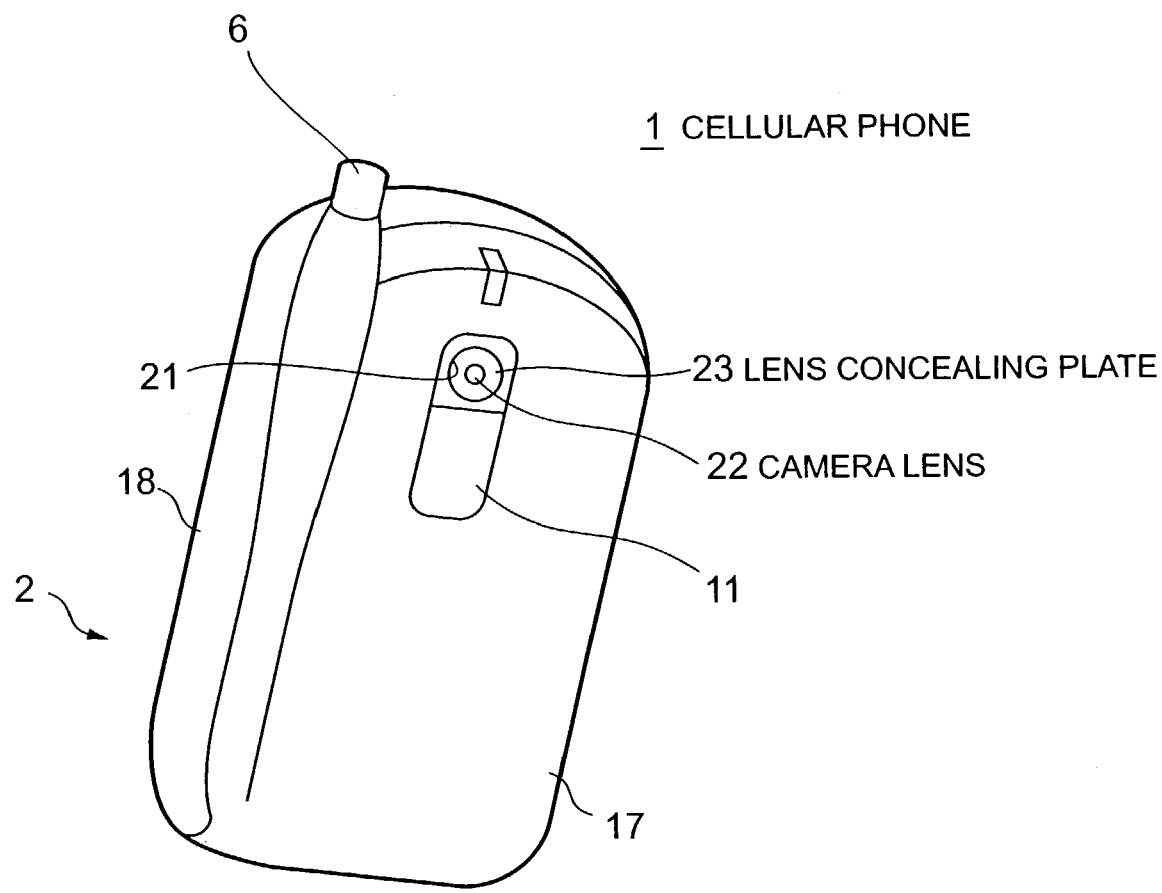
FIG. 2 is a perspective view of a folded cellular phone according to a first embodiment of the present invention, showing a closed state of a casing of the cellular phone.
Figure 3A:
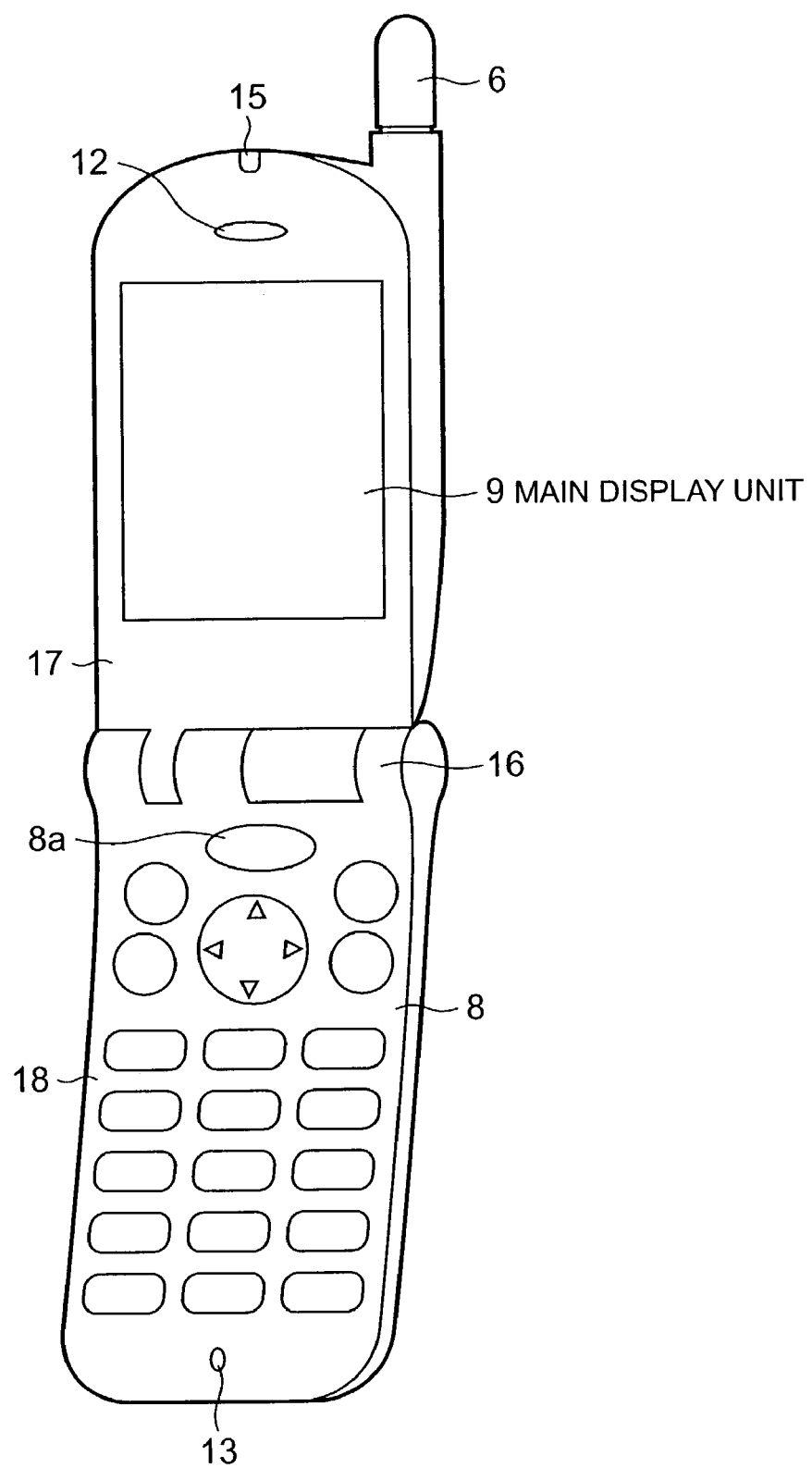
FIG. 3A is a perspective view of the constitution of the cellular phone, showing an opened state of the casing of the cellular phone.
Figure 3B:
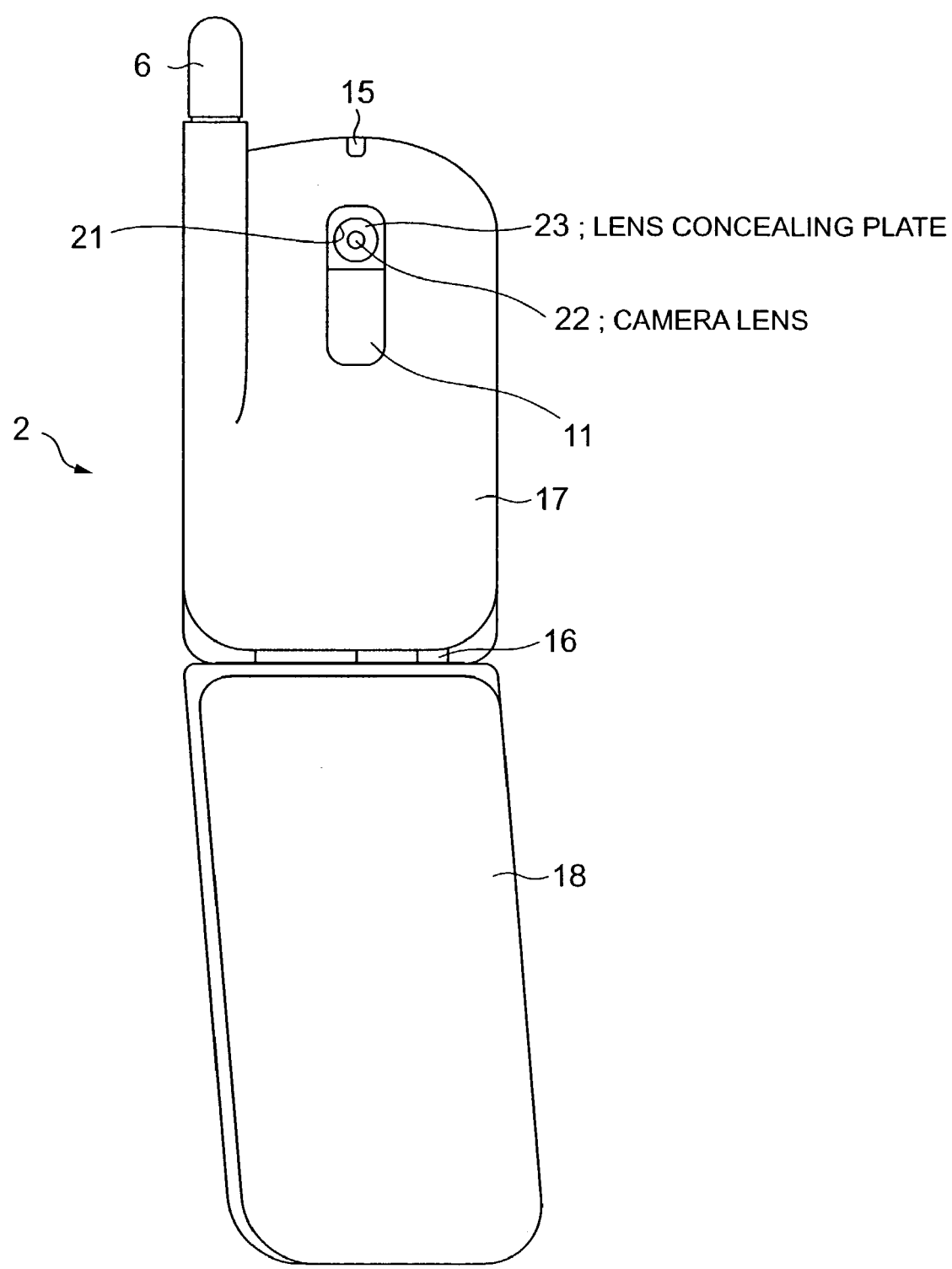
FIG. 3B is a view showing an opened state of the casing of the cellular phone.

FIG. 2 is a perspective view of a folded cellular phone according to a first embodiment of the present invention, showing a closed state of a casing of the cellular phone. FIGS. 3A and 3B are perspective views of the cellular phone, showing an opened state of the casing of the cellular phone. As shown in FIGS. 2, 3A and 3B, the casing 2 comprises upper and lower casings 17 and 18 connected to each other at a hinge unit 16. The hinge unit 16 provides a foldable structure to the cellular phone 1 by rotatably connecting the upper and lower casings 17 and 18 to each other. And also, the cellular phone 1 of the embodiment comprises a photographing function with an incorporated electronic camera and a data communication function connected to, for example, the Internet to enable access to be made to homepages and electronic mail to be transferred in addition to an original calling function.

Figure 4:
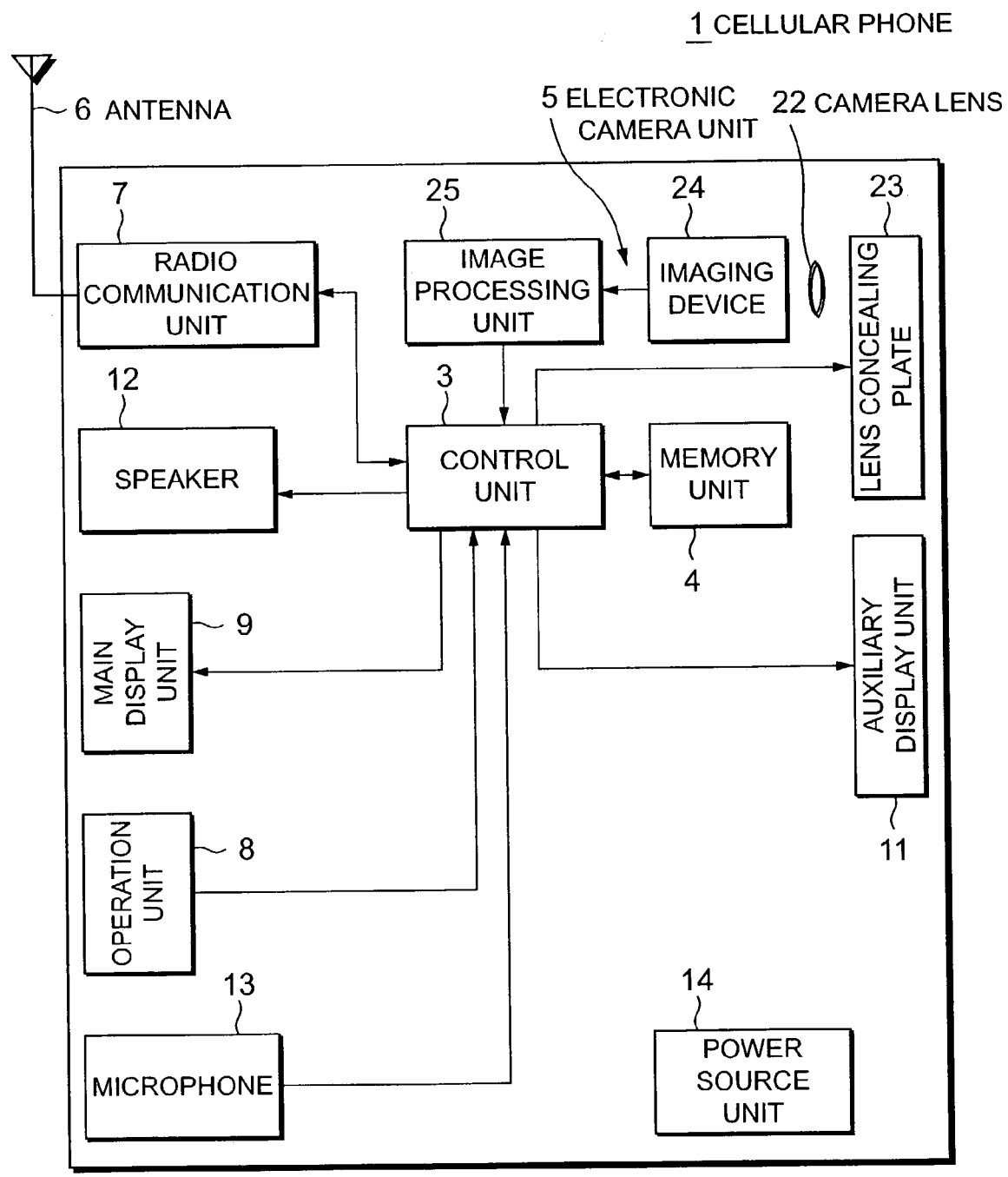
FIG. 4 is a block diagram showing the constitution of the cellular phone.

FIG. 4 is a block diagram showing the cellular phone. As shown in FIGS. 2, 3A, 3B and 4, the cellular phone 1 comprises a control unit (control means) 3 for controlling each component of a cellular phone main body, a memory unit 4 for storing data and processing programs to be executed by the control unit. The cellular phone 1 further comprises an electronic camera unit (camera) 5 for photographing images to be transmitted, an antenna 6 for transferring radio waves and a radio communication unit 7 for receiving radio waves through the antenna 6 and demodulating the radio waves into voices or data. The cellular phone 1 executes calling or data communication functions according to a predetermined protocol. The cellular phone 1 further comprises an operation unit 8 composed of various operation keys, a main display unit 9 arranged on a side which becomes an inner side when the cellular phone is folded. Preferably, the main display unit 9 is composed of a liquid crystal display. The cellular phone 1 further comprises an auxiliary display unit 11 arranged on a side which becomes an outer side when the cellular phone is folded, and is preferably composed of a liquid crystal display. The cellular phone 1 further comprises a speaker 12 for outputting voices, a microphone 13 for entering voices, a power source unit 14 composed of a battery pack, and an incoming call notification lamp 15 for notifying of an incoming call by, for example, lighting.

The control unit 3 executes a switching control program for controlling a lens concealing plate of the electronic camera 5 by switching it to a light transmitting state (transparent state) or a light blocking state (non-transparent state). The control unit 3 executes a display control program for controlling the main display unit 9 or the auxiliary display unit 11, a browser as a program for accessing homepages, and various processing programs stored in the memory unit 4, such as a mailer for creating and transmitting/receiving electronic mail. The control unit 3 controls each component by using various registers or flags stored in the memory unit 4, and the control unit 3 executes information management as well.

The memory unit 4 comprises semiconductor memories such as ROM and/or RAM, and stores various processing programs such as the switching control program executed by the control unit 3 and the display control program. The memory unit 4 stores various bits of information such as received information and data of images photographed by the electronic camera unit 5, and stores various registers or flags used by the control unit 3 during program execution. For example, the switching control program describes a process for setting the lens concealing plate 11 in the light transmitting state (transparent state) mainly during photographing, and in the light blocking state (non-transparent state) mainly in a period other than photographing.

As shown in FIGS. 2, 3B and 4, the electronic camera unit 5 is provided on a side, which becomes an outer side when the upper casing 17 is folded. The electronic camera unit 5 comprises a photograph window 21, on which a light incoming from an object is made incident, and a camera lens composed of, for example, a standard lens and arranged in the vicinity of the photograph window 21. The electronic camera unit 5 further comprises a lens concealing plate 23 arranged on the object side of the camera lens 22 to cover the camera lens 22. The electronic camera unit 5 further comprises an imaging device 24 composed of a CCD image pickup device for subjecting an image formed through the camera lens 22 to photoelectric conversion, and outputting an image signal as an electrical signal. The electronic camera unit 5 further comprises an image processing unit 25 for subjecting the image signal sent from the imaging device 24 to A/D conversion, and executing image processing such as gamma conversion or color space conversion for the digitized signal.

Figure 5:
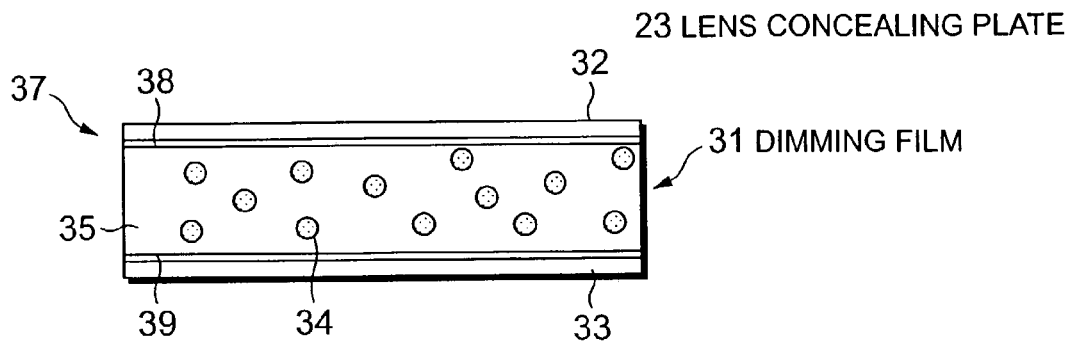
FIG. 5 is a schematic sectional view showing a constitution of a lens concealing plate of the cellular phone.

FIG. 5 is a schematic sectional view showing a lens concealing plate of the cellular phone. As shown in FIG. 5, the lens concealing plate 23 has a structure, where a dimming film (dimming layer) 31 having a light transmittance controlled in accordance with an applied voltage is held between two transparent glass substrates 32 and 33. The dimming film 31 is brought to a light transmitting state (transparent state) mainly during photographing, and a light made incident from the photograph window 21 is passed through the dimming film 31, and directly made incident toward the camera lens 22. During periods other than photographing, the dimming film 31 is brought to a light blocking state (non-transparent state). This causes the light made incident from the photograph window 21 to be scattered by the dimming film 31, providing no incident light from the photograph window 21 to the camera lens 22, and making the camera lens 22 invisible.

As shown in the same drawing, the dimming film 31 comprises a liquid crystal layer 37 formed by dispersing microcapsules (e.g., 1 to 2 µm in diameter) 34 containing liquid crystals in a polymer matrix 35. The dimming film 31 further comprises transparent conductive layers 38 and 39 arranged in both sides of the liquid crystal layer 37. When no voltage is applied between the two transparent conductive layers 38 and 39, liquid crystal molecules in the microcapsules 34 are orientated in an optional direction, and the incident light is scattered to set an opaque clouded state. When AC or DC voltage of, for example 30 to 150 V is applied between the two transparent conductive layers 38 and 39, the liquid crystal molecules in the microcapsules 34 are oriented in an electrical field direction, setting a transparent state with respect to the light. If the applied voltage is reduced, a half-transparent state is set to scatter a part of the incident light.

The operation unit 8 is arranged on a side that becomes an inner side when the lower casing 18 is folded. The operation unit 8 is constructed by arraying, on an inner surface of the casing 18, a photographing mode key 8a provided to select a photographing mode for enabling the electronic camera unit 5 to carry out photographing. The operation unit 8 also serves as a shutter button, a mail mode selection key for creating and transferring electronic mail, a calling mode selection key used for voice calling, a browser selection key for starting a browser to access homepages, a clear key for transferring from the photographing mode to a stand-by mode for standing ready for an operation or an incoming call by displaying a stand-by screen. The operation unit 8 also comprises a power key, ten keys for entering numerals and a cursor key for moving a cursor on a display screen of the main display unit 9. Here, the photographing mode key 8a functioned also as the shutter button. However, a dedicated shutter button may be separately provided, for example on an upper end of the upper casing 17.

The main display unit 9 is arranged on a side that becomes an inner surface when the upper casing 17 is folded, and composed of, for example, a transmissive liquid crystal display. The auxiliary display unit 11 is arranged below the photograph window 21 of the side which becomes the outer side when the upper casing 17 is folded, composed of, for example a transmissive liquid crystal display, and adapted to display present time, incoming call notification or the like.

Figure 6:
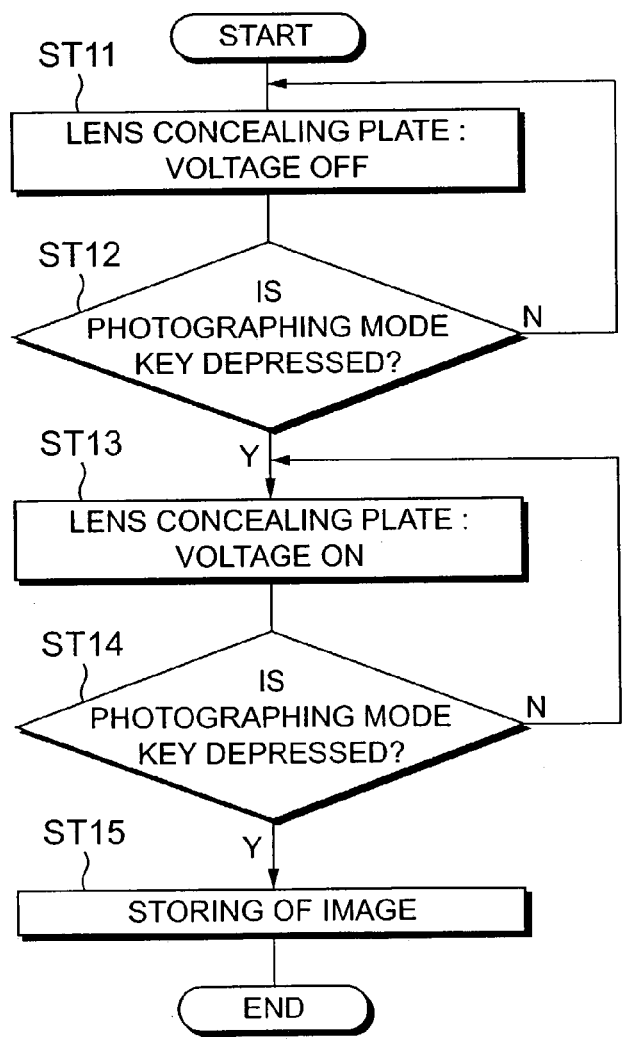
FIG. 6 is a flowchart explaining an operation of the cellular phone.
Figure 7:
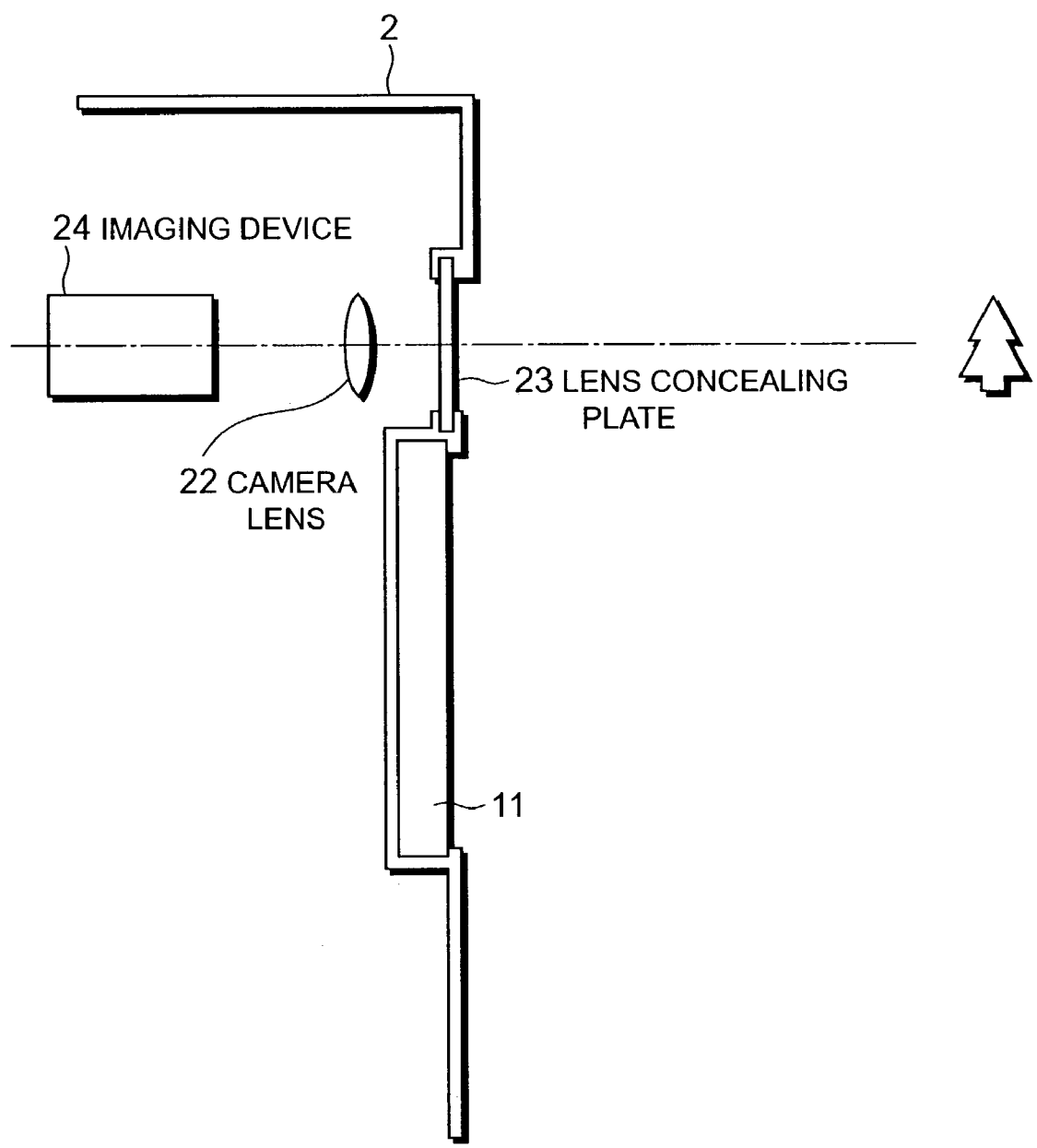
FIG. 7 is an explanatory view explaining an operation of the cellular phone.
Figure 8A:
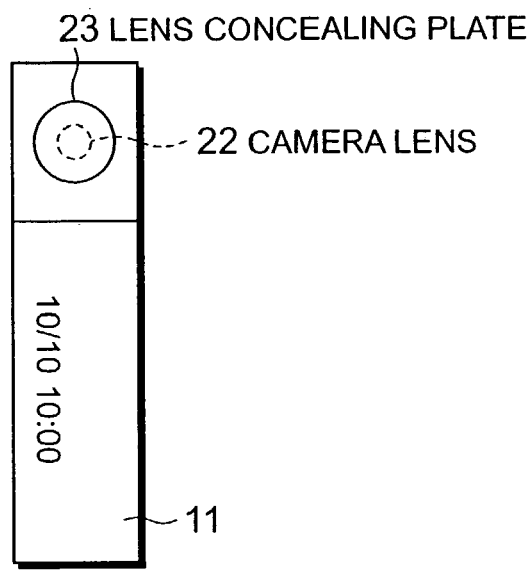
FIG. 8A is an explanatory views showing a non-transparent state of the lens concealing plate.
Figure 8B:
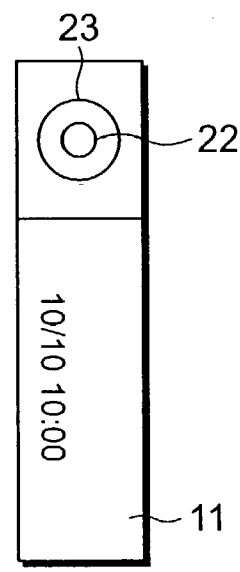
FIG. 8B is an explanatory views showing a transparent state of the lens concealing plate.

Next, description will be made of an operation of the cellular phone 1 of the embodiment by referring to FIGS. 6, 7, 8A and 8B. FIG. 6 is a flowchart explaining an operation of the cellular phone. FIG. 7 is an explanatory view explaining an operation of the cellular phone. FIGS. 8A and 8B are explanatory views explaining an operation of the cellular phone, i.e., FIG. 8A shows a non-transparent state of the lens concealing plate, and FIG. 8B shows a transparent state of the lens concealing plate.

As shown in FIG. 6, after application of power, the control unit 3 enters the stand-by mode for standing ready for an input operation by an operator or an incoming call, and displays the stand-by screen on the main display unit 9. The control unit 3 applies no voltage to the dimming film 31 to set a light blocking state for scattering an incident light (ST11). At this time, as shown in FIG. 8A, the camera lens 22 is invisible. Present time or the like is displayed on the auxiliary display unit 11. In this state, when the operator depresses the photographing mode key 8a to select the photographing mode (ST12), the process transfers to the photographing mode.

Thus, the control unit 3 applies a predetermined voltage to the dimming film 31 to set a light transmitting state as shown in FIG. 8B (ST13). A light made incident from the photograph window 21 is transmitted through the dimming film 31, and directly made incident toward the camera lens 22, thereby enabling photographing to be carried out. Also, the control unit 3 displays an object before the camera lens 22 on the screen of the main display unit 9, and displays a message indicating that the camera is in a photographing stand-by state at present, and photographing can be carried out by depressing the photographing mode key 8a again. In this state, when wishing to photograph a landscape ahead, as shown in FIG. 7, the operator directs the camera lens 22 to an object, sets the cellular phone to ready, and decides a composition so as to photograph the object in a preferred size or within a preferred range by watching an image of the object displayed on the display unit 9, and correcting a position or the like of the cellular phone.

After having decided the composition and checked the photographing range or the like, the operator depresses the photographing mode key 8a again (ST14). A photographed image is captured by this operation. Upon reception of image data obtained by the photographing from the image processing unit 24, the control unit 3 stores the data in the memory unit 4 (ST15) and stops the application of the voltage to the dimming film 31 to set a light blocking state. This scatters the incident light, prevents the camera lens 22 from becoming visible, and supplies a predetermined display signal to the main display unit 9 based on the image data to display the image. Subsequently, when the operator wishes to attach his own photographed image to electronic mail, the operator depresses the mail mode selection key of the operation unit 8, to set the mail mode, and executes a transmission operation. The control unit 3 accordingly sends image data obtained by photographing through the radio communication unit 7 to the other cellular phone designated by the operator.

Thus, according to the embodiment, the lens concealing plate 23 is arranged on the object side of the camera lens 22 and, by the operation of the operator, this lens concealing plate 23 is brought to the light blocking state (non-transparent state mainly in the period other than photographing. This prevents the camera lens 22 from becoming visible, and in the light transmitting state (transparent state) mainly during photographing, enabling photographing to be carried out. Therefore, even when electronic mail is transferred in a place of many people around the operator in a period other than photographing, it is possible to prevent careless direction of the camera lens from giving any uneasy or uncomfortable feelings to the people around him.

It is also possible to improve the design of the cellular phone 1 incorporating the camera lens. Since the lens concealing plate 23 is fixed, it is possible to prevent dust or the like from being stuck to the camera lens 22. Compared with a case of providing a lens cover to be mechanically opened/closed, no time and labor are necessary for manual opening/closing, and the lens concealing plate 23 is set transparent by depressing the photographing mode selection key 8a, automatically setting a state of enabling photographing. Thus, it is possible to carry out quick and sure photographing.

An auxiliary display unit 11 in this embodiment may be an auxiliary display unit 11A that can be set to be a mirror surface during photographing or the like when necessary, and used by an operator (photographer) to decide a composition when the operator himself is photographed.

Figure 9:
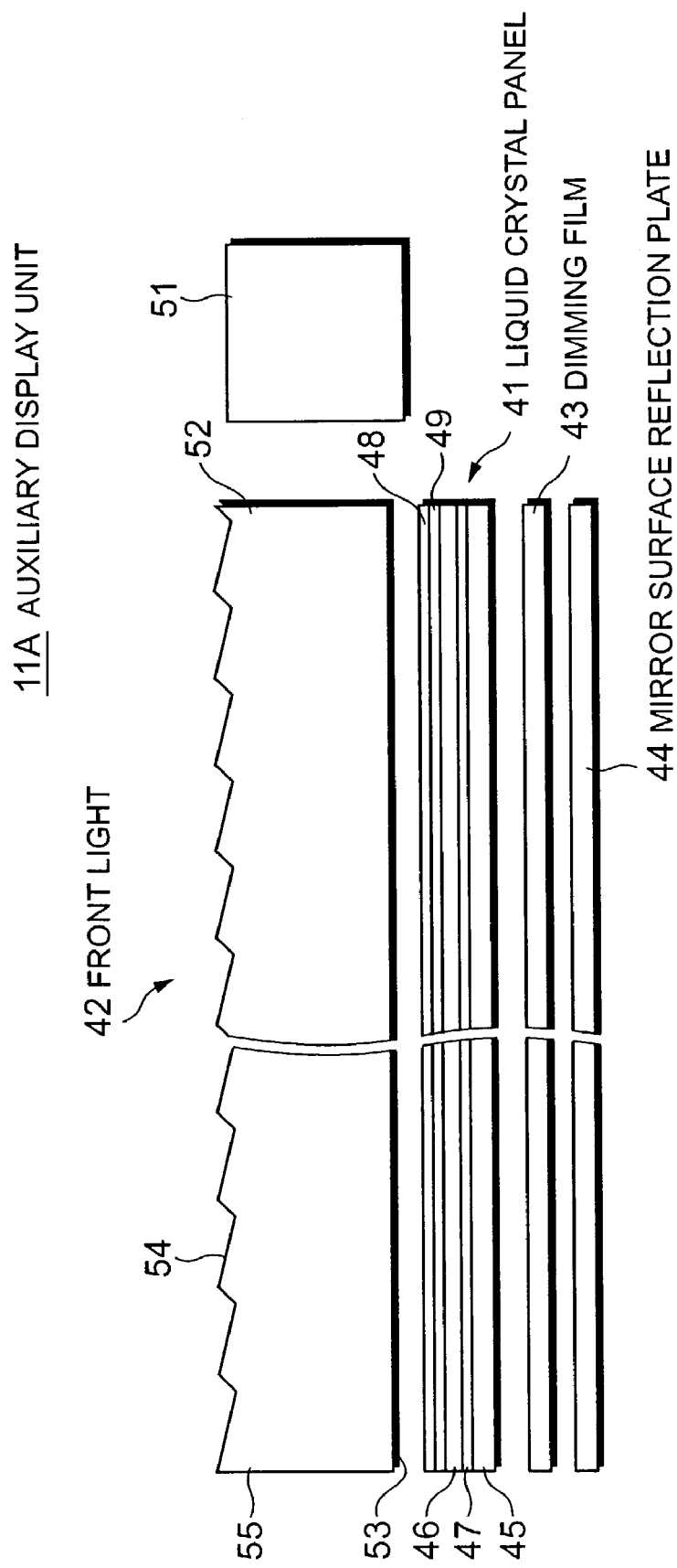
FIG. 9 is a schematic sectional view of an auxiliary display unit 11A of a folded cellular phone.

FIG. 9 is a schematic sectional view of an auxiliary display unit 11A of a folded cellular phone. As shown in FIG. 9, the auxiliary display unit 11A comprises a liquid crystal panel 41 and a front light 42 arranged on a front side of the liquid crystal panel 41. The auxiliary display unit 11A further comprises a dimming film 43 arranged on a rear side of the liquid crystal panel 41, and adapted to have a light transmittance controlled in accordance with an applied voltage. The auxiliary display unit 11A further comprises a mirror surface reflection plate 44 arranged on a rear side of the dimming film 43.

Preferably, the liquid crystal panel 41 is a TFT panel rectangular in outer shape. As shown in the drawing, the liquid crystal panel 41 comprises a TFT substrate 45 provided with many TFT and transparent pixel electrodes and a counter substrate 46 fixed oppositely to the TFT substrate 45 by a gap of several [µm]. The liquid crystal panel 41 further comprises a liquid crystal layer 47 sealed in the gap, and a deflection plate 48 and a ¼ wavelength plate 49 arranged on a front side of the counter substrate 46.

The front light 42 comprises a strip light source 51 composed of a fluorescent lamp or the like to emit a strip light, and an optical waveguide 55 made of a light transmission material. The optical waveguide 55 receives the light of the strip light source 51 made incident from a light incident end surface 52 side. The optical waveguide 55 radiates a surface illumination light from a planar light irradiation surface 53 toward the liquid crystal panel 41 arranged on the rear side of the front light 42, and transmits a reflected light of the liquid crystal panel 41 from the light irradiation surface 53 to a prism surface 54 side surface-processed in a prism shape. The optical waveguide 55 is provided with a group of parallel ridge lines.

Here, an optical axis of the camera lens 22 is set to be slightly inclined with respect to a normal line on a surface of, for example the auxiliary display unit 11A outside an upper casing 17. A range displayed on the auxiliary display unit 11A set to be the mirror surface coincides with a range to be photographed when the operator (photographer) photographs himself. The dimming film 43 is similar in constitution to the dimming film 31 of the lens concealing plate 23 shown in FIG. 5. On the auxiliary display unit 11A, pixels of the liquid crystal panel 41 are all set to be light transmissive (displayed white) mainly during photographing, and the dimming film 43 is brought to a light transmitting state, setting the entire auxiliary display unit 11A to be a mirror surface. Mainly in a period other than photographing, the dimming film 43 is brought to a light blocking state to display characters and images.

Figure 10:
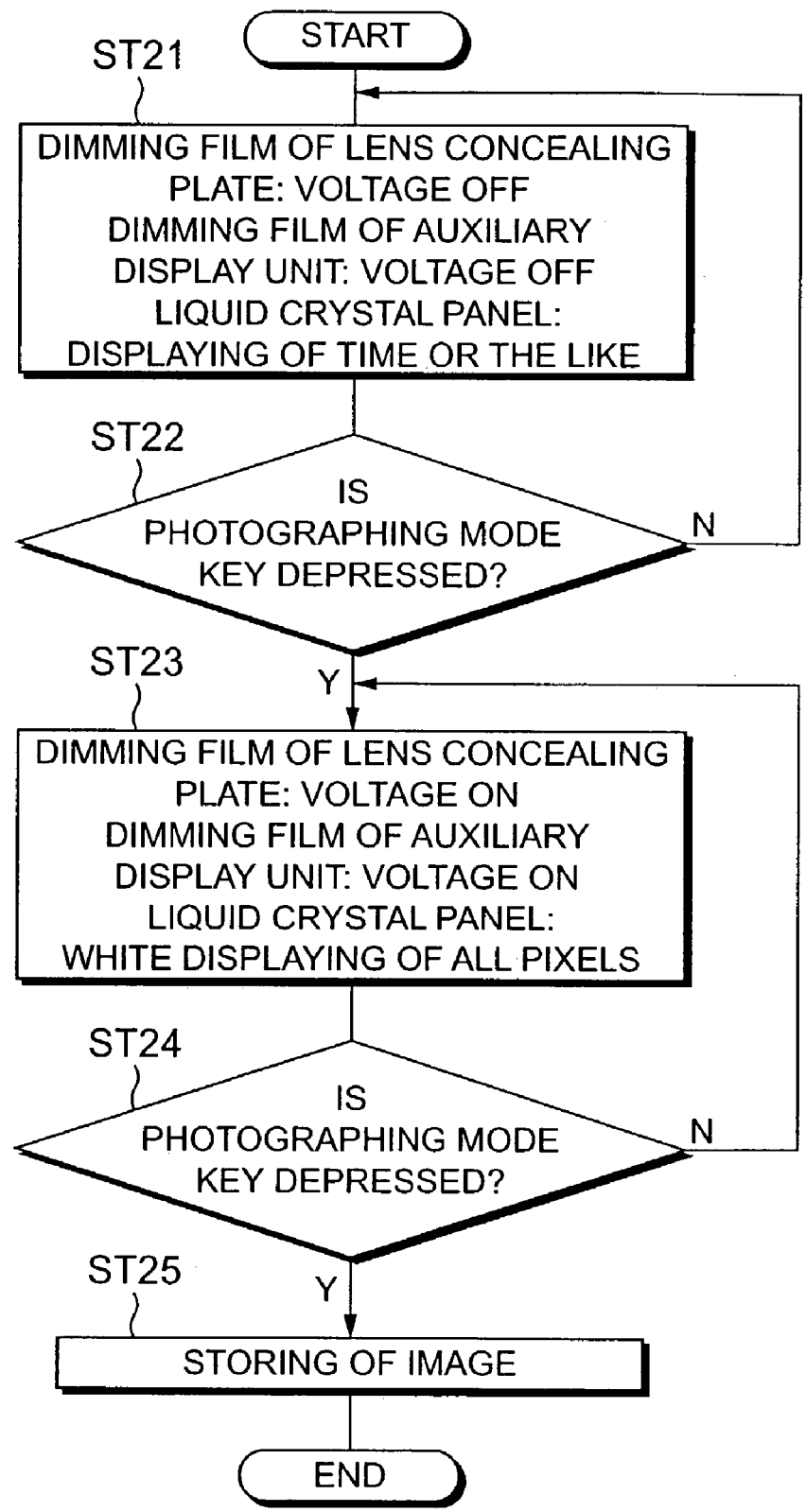
FIG. 10 is a flowchart explaining an operation of the cellular phone.

Next, description will be made of an operation of the cellular phone using the auxiliary display unit 11A. FIG. 10 is a flowchart explaining an operation of the cellular phone.

As shown in FIG. 10, after power is turned on, the control unit 3 enters a stand-by mode for standing ready for an input operation by an operator or an incoming call, and displays a stand-by screen on the main display unit 9, and present time, incoming call notification or the like on the auxiliary display unit 11A (ST21). At this time, the control unit 3 applies no voltage to the dimming film 43 to set a light blocking state for scattering an incident light. Thus, the camera lens 22 is invisible. In this state, when the operator depresses a photographing mode key 8a to select a photographing mode (ST22), the process transfers to the photographing mode.

Thus, the control unit 3 applies a predetermined voltage to the dimming film 43 to set a light transmitting state, simultaneously controls the liquid crystal panel 41 to set all its pixels to be light transmissive (displayed white) (ST23), sets the lens concealing plate 23 in a light transmitting state, and making a reflected light of the mirror surface reflection plate 44 visible to the operator. That is, a light is made incident on a camera lens 22, thereby enabling photographing to be carried out, and the auxiliary display unit 11A is set to be a mirror surface, displaying an object. Also, the control unit 3 displays an object before the camera lens 22 on the screen of the main display unit 9, and a message indicating that the camera is in a photographing stand-by state at present, and photographing can be carried out by depressing the photographing mode key 8a again.

When wishing to photograph himself, the operator directs the camera lens 22 to himself, sets the cellular phone ready, and simultaneously decides a composition while watching the auxiliary display unit 11A set to be the mirror surface. That is, the operator corrects a position or the like of the cellular phone so as to photograph, for example his own face in a desired size or arrangement. After having decided the composition and checked a photographing range or the like, the operator depresses the photographing mode key 8a again (ST24). In this case, the control unit 3 supplies a predetermined voice signal to a microphone 13, and generates a shutter sound.

Upon reception of image data obtained by the photographing from an image processing unit 25, the control unit 3 stores the data in a memory unit 4 (ST25), and supplies a predetermined display signal to the main display unit 9 based on the image data to display the image. Here, the photographing mode is released by depressing a clear key, and the dimming films 43 is brought to light blocking states (non-transparent states). The camera lens 22 is made invisible, and the auxiliary display unit 11A is set to be a non-mirror surface, and present time or the like is displayed on the liquid crystal panel 41. Then, by a transmission operation of the operator, the control unit 3 sends the image data obtained by the photographing through a radio communication unit 7 to the other cellular phone or the like designated by the operator.

Thus, since the auxiliary display unit 11A is set to be a mirror surface only during photographing, and can be used for deciding a composition, mainly in a period other than photographing, the mirror surface portion gives no uncomfortable design feelings or damage to the beauty. The operator (photographer) can prevent photographing failures by surely checking the photographing range and the position of the object, and smoothly deciding a composition based on the image of the object displayed on the auxiliary display unit 11A set to be the mirror surface during photographing. In a period other than photographing, the auxiliary display unit 11A can be used as a normal display for displaying, for example present time or the like. Also, the auxiliary display unit 11A can be used not only for checking the photographing range but also for adjusting a personal appearance.

Figure 11:
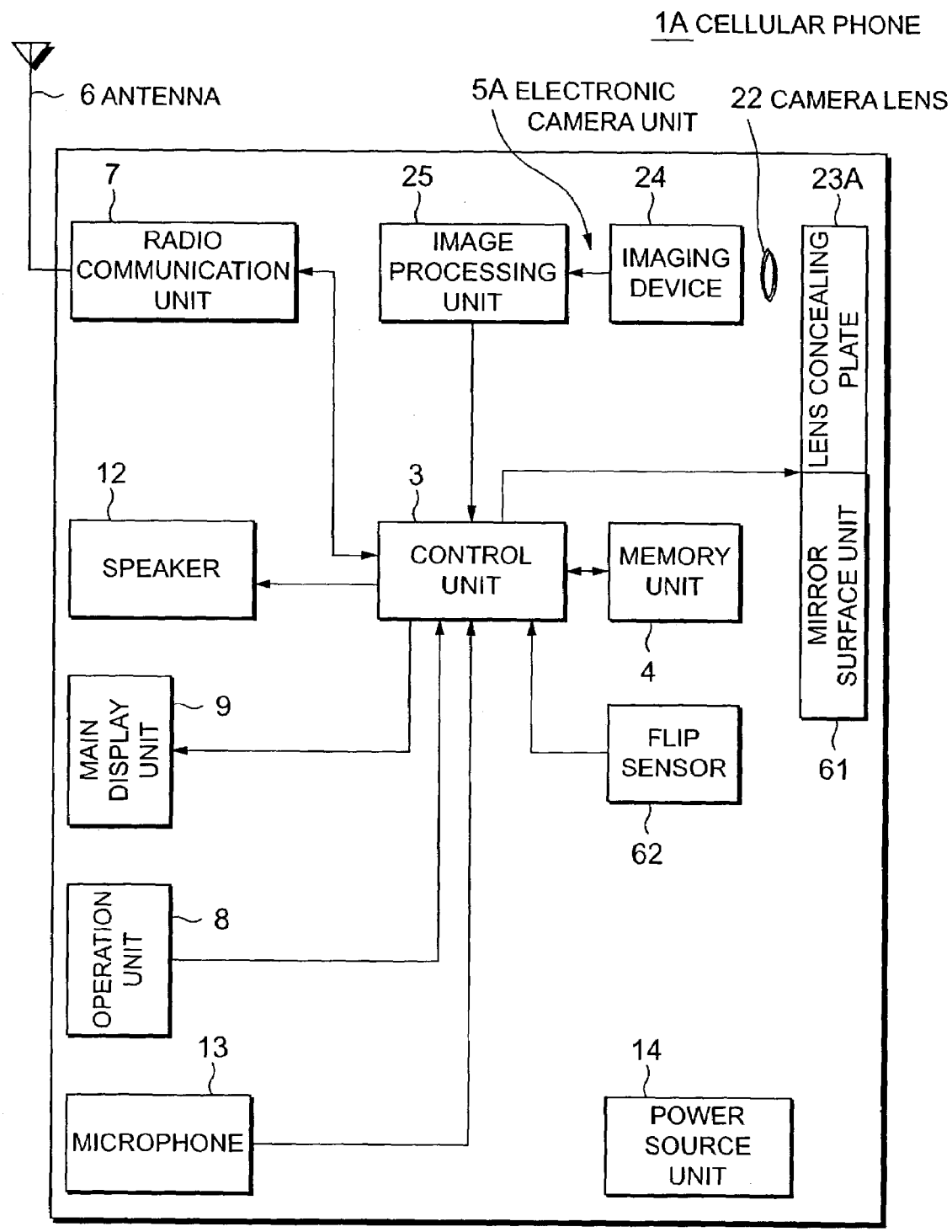
FIG. 11 is a block diagram showing a folded cellular phone according to another embodiment of the present invention.

FIG. 11 is a block diagram showing a folded cellular phone according to another embodiment of the present invention. A major difference is that the auxiliary display unit is removed, instead a mirror surface unit is provided integrally with the lens concealing plate so as to be made visible when necessary. The cellular phone further comprises a flip sensor is provided for detecting whether a casing is open or not. Other compositions are approximately similar to those of the first embodiment, and thus explanation thereof will be made only briefly.

As shown in FIG. 11, the cellular phone 1A of the embodiment comprises a casing 2 to be folded, a control unit 3, a memory unit 4, an electronic camera unit 5A, an antenna 6, a radio communication unit 7, an operation unit 8, a main display unit 9, a mirror surface unit 61 arranged on a side which becomes an outer side when the cellular phone is folded, a flip sensor (opening/closing detecting means) 62 for detecting whether the casing 2 is open or not, a speaker 12, a microphone 13 and a power source unit 14. As shown in the drawing, the electronic camera unit 5A comprises a photograph window 21, a camera lens 22, a lens concealing plate 23A, an imaging device 24 and an image processing unit 25.

Figure 12:
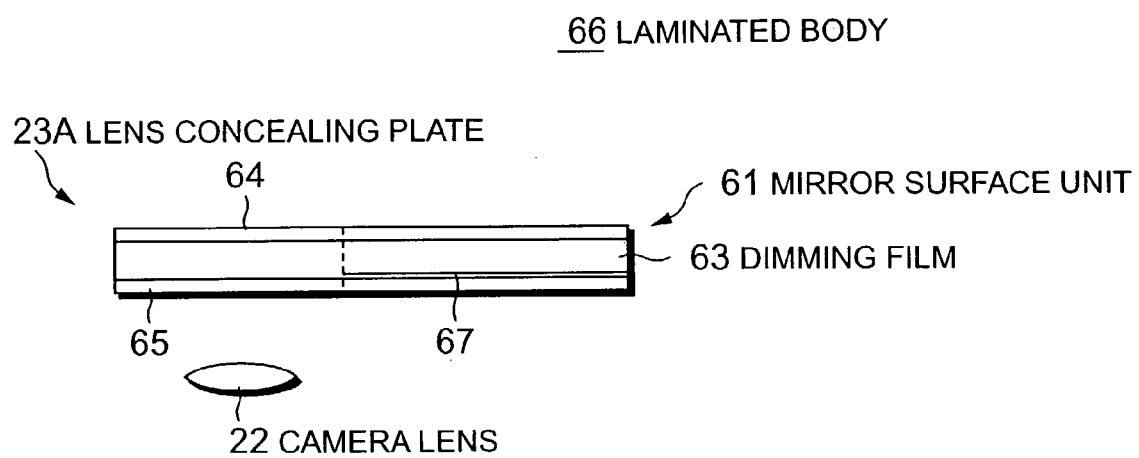
FIG. 12 is a schematic sectional view showing a lens concealing plate and a mirror surface unit of the cellular phone.
Figure 13:
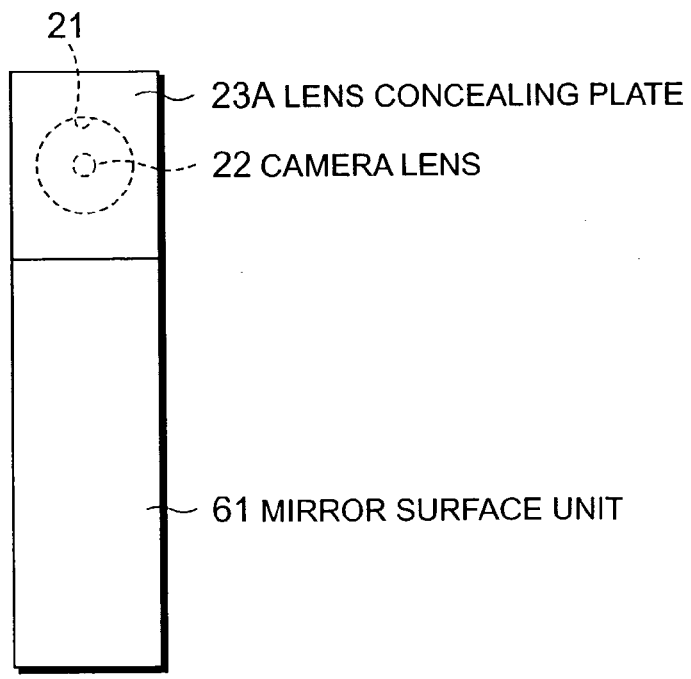
FIG. 13 is a plan view showing the lens concealing plate and the mirror surface unit.

FIG. 12 is a schematic sectional view showing a lens concealing plate and a mirror surface unit of the cellular phone. FIG. 13 is a plan view showing the lens concealing plate and the mirror surface unit.

As shown in FIGS. 12 and 13, the lens concealing plate 23A comprises a dimming film 63 adapted to have a light transmittance controlled in accordance with an applied voltage, and disposed between a pair of front and back side transparent glass substrates 64 and 65. The lens concealing plate 23A further comprises an upper portion of a laminated body 66 formed by applying plating to a lower region (predetermined region close to a hinge 16 of an upper casing 17) of a surface of the backside transparent glass substrate 65 to become a mirror surface. Thus, the surface of the backside transparent glass substrate 65 is left in a transparent state without being subjected to mirror surface processing.

As shown in the drawing, the mirror surface unit 61 comprises a lower portion of the laminated body 66, in which the surface of the backside transparent glass substrate 65 is set to be a mirror surface reflection plate 67 by being subjected to mirror surface processing. The flip sensor 62 detects whether the casing 2 is open or not. Based on a result of the detection, when the casing 2 is open, and a photographing mode key 8a is depressed, the control unit 3 brings the lens concealing plate 23A to a transparent state, the mirror surface unit 61 becomes a mirror surface, and a the cellular phone enters the photographing stand-by state.

Figure 14:
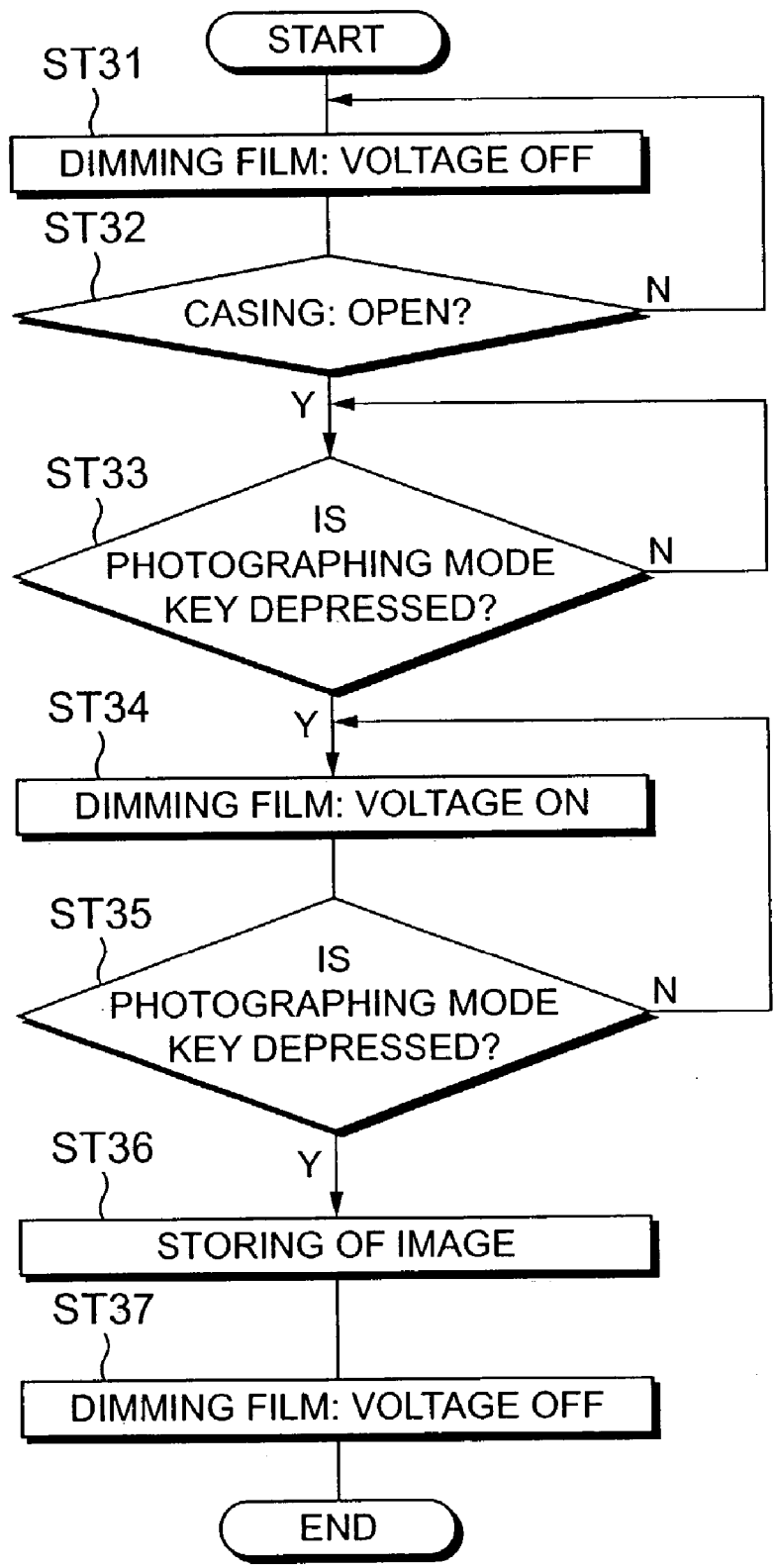
FIG. 14 is a flowchart explaining an operation of the cellular phone.

Next, description will be made of an operation of the cellular phone 1A of the embodiment by referring to FIG. 14. FIG. 14 is a flowchart explaining an operation of the cellular phone.

First, after power is turned on, the control unit 3 enters a stand-by mode, and applies no voltage to the dimming film 63. Accordingly, the lens concealing plate 23A is brought to a light blocking state for scattering an incident light, and the camera lens 22 is invisible. The mirror surface unit 61 is also brought to a light blocking state to be a non-mirror surface (ST31). Then, proceeding to ST32, the control unit 3 determines an opened/closed state of the casing 2 based on a detecting signal sent from the flip sensor 62. If the opened state of the casing 2 is determined, the process proceeds to ST33. The process returns to ST31 if the closed state of the casing 2 is determined. Upon determination that the photographing mode key 8a is depressed in ST33, the control unit 3 applies a predetermined voltage to the dimming film 63 (ST34).

Thus, the lens concealing plate 23A is brought to a light transmitting state, and a light incoming from the object is made incident on the camera lens 22. Moreover, the mirror surface unit 61 is brought to a light transmitting state to make a reflected light from the mirror surface reflection plate 67 visible to the operator. That is, the mirror surface unit 61 is set to be a mirror surface to display an image of the object.

In this state, when wishing to photograph himself, the operator directs the camera lens 22 to himself, sets the cellular phone 1A ready, and simultaneously corrects a position or the like of the cellular phone 1A so as to photograph his own face in a desired size or arrangement on the mirror surface unit 61 set to be the mirror surface. After having decided the composition and checked a photographing range or the like, the operator depresses the photographing mode key 8a again (ST35).

Then, upon reception of image data obtained by the photographing from the image processing unit 24, the control unit 3 stores the data in a memory unit 4 (ST36), and stops the application of the voltage to the dimming film 63 to set a light blocking state, thereby scattering an incident light (ST37). Thus, the camera lens 22 is made invisible again, and the mirror surface unit 61 is also set to be a non-mirror surface. Then, by a transmission operation of the operator, the control unit 3 sends the image data obtained by the photographing through the radio communication unit 7 to the other cellular phone or the like designated by the operator.

According to the embodiment, effects similar to those of the foregoing embodiment can be provided. In addition, since the lens concealing plate and the mirror surface unit are integrated, the number of components can be reduced, and control circuitry can be simplified, thereby reducing costs.

The embodiments of the present invention have been described in detail with reference to the drawings. However, specific constitutions are not limited to the embodiments, and design changes or the like made without departing from the teachings of the invention are also included within the invention.

For example, the embodiment has been described with reference to the case of using the cellular phone as the portable electronic equipment. However, the portable electronic equipment is not limited to the cellular phone. For example, a personal handyphone system (PHS) terminal, and a personal digital assistance (PDA) provided with a radio communication function may be used, and effects approximately similar to those of the cellular phone can be provided. The radio communication function is not always necessary, and a digital camera, especially a wristwatch digital camera may be used. A notebook personal computer incorporating a camera may also be used. In the case of the cellular phone, it may not always be a cellular phone to be folded.

The embodiment has been described with reference to the case of simply providing the transparent conductive layer of the dimming film of the lens concealing plate, for example without patterning the conductive layer on the entire part. For example, when the transparent conductive layer is patterned, and photographing is not carried out, characters and images may be displayed by displaying a predetermined pattern or dividing it into a number of pixels. In place of the dimming film, a liquid crystal panel similar to that used in the main display unit or the auxiliary display unit may be used, all the pixels may be brought to a light transmitting state on the photographing mode, and predetermined displaying may be carried out on other modes.

Figure 15:
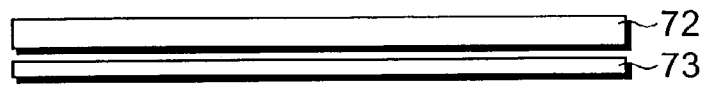
FIG. 15 is a schematic sectional view showing an auxiliary display unit of a cellular phone according to a modified example of the first embodiment of the present invention.

The embodiment has been described with reference to the case of using the liquid crystal display as a display used in the main display unit or the auxiliary display unit. However, the display is not limited to the liquid crystal display. For example, an EL display may be used. A CRT or a plasma display may also be used. That is, as shown in FIG. 15, an auxiliary display unit 71 may be constructed by arranging a mirror surface reflection plate 73 on a rear side of an EL display panel 72 composed of a number of transparent inorganic EL elements.

The EL display panel 72 executes normal displaying by receiving a predetermined display control signal from a control unit, and becomes a transparent body on its entire region by stopping application of voltage to all pixels. An external light is transmitted through the EL display panel 72, and reflected on a mirror surface reflection plate 83, and a reflected light is viewed. Control may be carried out to set a transparent state only when a dimming film is interposed between the EL display panel 72 and the mirror surface reflection plate 73, and set to be a mirror surface. Thus, by using the EL display panel, it is possible to realize miniaturization and weight-reduction by reducing the number of components.

The embodiment has been described with reference to the case of setting the entire region of the display surface when the main display unit or the auxiliary display unit is set to be a mirror surface. However, a part of the display surface may be set to be a mirror surface. In this case, an area, a position and a shape of a region to become a mirror surface may be arranged to be changed when necessary. In a region not to become a mirror surface, characters, pictures or the like may be displayed. The main display unit or the auxiliary display unit may be set to be a mirror surface in a period other than photographing and adjusting of a personal appearance, and predetermined pictures or animation may be displayed on the mirror surface and enjoyed according to user's predilection.

The embodiment has been described with reference to the case of transmitting still images photographed by the electronic camera unit. However, the cellular phone may be used as a television telephone. In this case, for example an upper half region of the main display unit may be set to be a mirror surface, a composition may be decided by displaying the operator himself, and an image of the other party may be displayed on a lower half region of the main display unit.

The camera lens is not limited to the standard lens, and it may be a wide-angle lens. A plurality of camera lens may be provided to be selectively used. In this case, according to a type of a camera lens, an area or a position of the region of the main display unit or the auxiliary display unit to become a mirror surface may be changed.

The foregoing embodiment has been described with reference to the case of carrying out normal displaying, for example when the main display unit or the auxiliary display unit is not set to be a mirror surface. However, no displaying may be executed when the unit is not set to be a mirror surface. Also, a stroboscopic device may be provided.

In the embodiment, the photographing was carried out by depressing the photographing mode key twice. However, a self-timer may be provided to enable photographing to be carried out after a fixed period. In this case, on the photographing mode, the incoming call notification lamp may be turned on and off for the fixed period.

The embodiment has been described with reference to the case of arranging the auxiliary display unit below the photograph window and the camera lens. However, the arrangement is not limited to this, and an auxiliary display unit of a relatively large area may be provided, and the photograph window may be arranged on a center of the auxiliary display unit.

Figure 16:
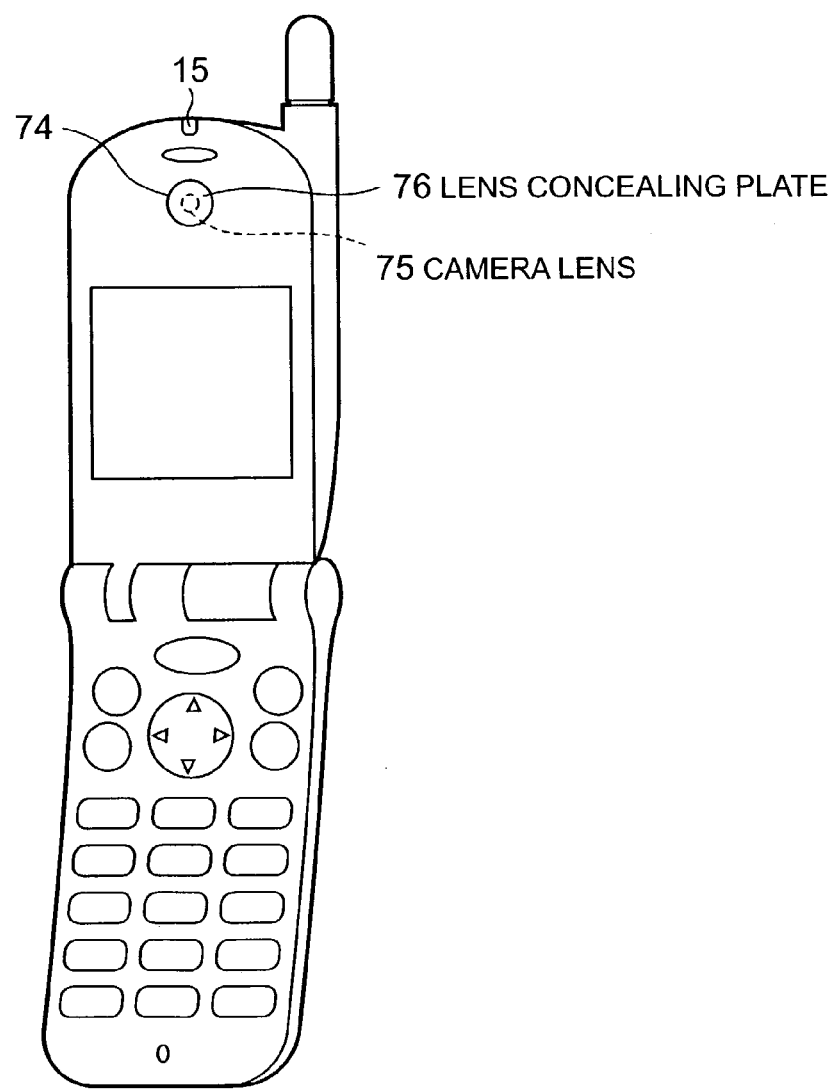
FIG. 16 is a perspective view showing a cellular phone according to a modified example of the first embodiment of the present invention.

The another embodiment has been described with reference to the case of setting the auxiliary display unit to be a mirror surface. However, as shown in FIG. 16, a photograph window 74 of an electronic camera unit, a lens concealing plate 75 and a camera lens 76 may be provided on a side which becomes an inner side when an upper casing of a cellular phone is folded, and a main display unit may be composed of a liquid crystal display to become a mirror surface when necessary.

Figure 17:
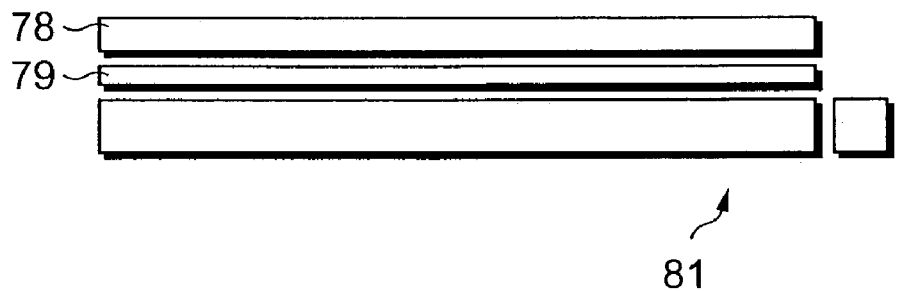
FIG. 17 is a schematic sectional view showing an auxiliary display unit of a cellular phone according to another modified example of the first embodiment of the present invention.

The another embodiment has been described with reference to the case of constructing the auxiliary display unit by using the reflective liquid crystal display. However, a transmissive liquid crystal display may be used. That is, as shown in FIG. 17, an auxiliary display unit 77 may be composed of a liquid crystal panel 78, a half-mirror 79 arranged on a rear side of the liquid crystal panel 78, and a backlight 81 arranged on a rear side of the half-mirror 79. Here, a dimming film may be arranged between the liquid crystal panel and the half-mirror.

Figure 18:
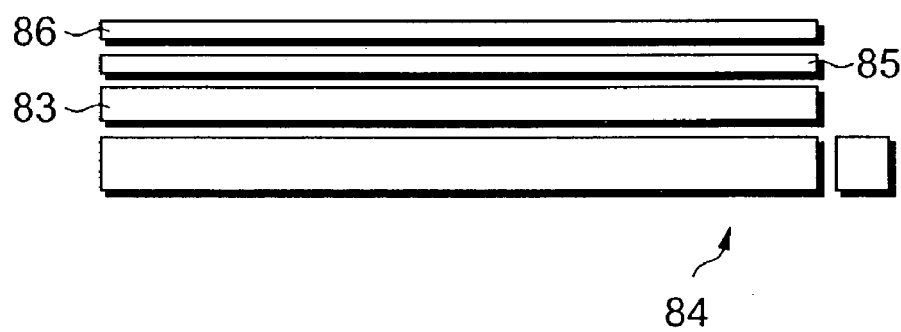
FIG. 18 is a schematic sectional view showing an auxiliary display unit of a cellular phone according to yet another modified example of the first embodiment of the present invention.

Further, as shown in FIG. 18, an auxiliary display unit 82 may be composed of a liquid crystal panel 83, a backlight 84 arranged on a rear side of the liquid crystal panel 83, a dimming film 85 arranged on a front side of the liquid crystal panel 83, and a half-mirror 86 arranged on a front side of the dimming film 85. Here, the backlight may be turned off if the auxiliary display unit is set to be a mirror surface, and used.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A portable electronic equipment comprising:
   forming means for forming an image of an object;
   concealing means for concealing said forming means, said concealing means attached to an outer surface of said portable electronic equipment, said concealing means comprising a first dimming layer having a light transmittance controlled in accordance with an applied voltage;
   judging means for judging whether a predetermined condition is satisfied or not;
   controlling means for controlling said means based on a result of said judging means;
   decision means for deciding a composition of said object, said decision means arranged in the vicinity of said concealing means and held in a mirror surface state or a non-mirror surface state by switching based on electrical control, said decision means comprising a mirror surface reflection portion for reflecting an incoming light on a mirror surface and a second dimming layer arranged on a front surface side of said mirror surface reflection portion and having a light transmittance controlled in accordance with an applied voltage; and
   displaying means comprising a liquid crystal panel capable of displaying characters or images, said second dimming layer arranged on a rear surface side of said liquid crystal panel and said mirror surface reflection portion arranged on a rear surface side of said second dimming layer.

2. The portable electronic equipment as claimed in claim 1, wherein said decision means is adapted to said displaying means.

3. The portable electronic equipment as claimed in claim 2, further comprises second controlling means for controlling said concealing means and said displaying means to bring the first and second dimming layers to light transmitting states during photographing, and to light blocking states in a period other than the photographing.

4. The portable electronic equipment as claimed in claim 2, wherein said portable electronic equipment is a cellular phone.

5. portable electronic equipment comprising:
   a camera lens that forma an image of an object;
   a lens concealing plate that conceals said camera lens, said lens concealing plate attached to an outer surface of said portable electronic equipment, said lens concealing plate comprising a first dimming layer having a light transmittance controlled in accordance with an applied voltage;

a judging circuit that judges whether a predetermined condition is satisfied or not;

a controller that controls said lens concealing plate based on a result of said judging circuit;

a decision circuit that decides a composition of said object, said decision circuit arranged in the vicinity of said lens concealing plate and held in a mirror surface state or a non-mirror surface state by switching based on electrical control, said decision circuit comprising a mirror surface reflection portion for reflecting an incoming light on a mirror surface and a second dimming layer arranged on a front surface side of said minor surface reflection portion and having a light transmittance controlled in accordance with an applied voltage; and a display comprising a liquid crystal panel capable of displaying characters or images, said second dimming layer arranged on a rear surface side of said liquid crystal panel and said mirror surface reflection portion arranged on a rear surface side of said second dimming layer.

6. The portable electronic equipment as claimed in claim 5, wherein said decision circuit is adapted to said display.

7. The portable electronic equipment as claimed in claim 6, further comprises second controller that controls said lens concealing plate and said display to bring the first and second dimming layers to light transmitting states during photographing, and to light blocking states in a period other than the photographing.

8. The portable electronic equipment as claimed in claim 6, wherein said portable electronic equipment is a cellular phone.

* * * * *